United States Patent
Lin et al.

(10) Patent No.: US 11,720,599 B1
(45) Date of Patent: Aug. 8, 2023

(54) CLUSTERING AND VISUALIZING ALERTS AND INCIDENTS

(71) Applicant: Pivotal Software, Inc., Palo Alto, CA (US)

(72) Inventors: Derek Chin-Teh Lin, San Mateo, CA (US); Regunathan Radhakrishnan, Foster City, CA (US); Rashmi Raghu, San Jose, CA (US); Jin Yu, Sydney (AU)

(73) Assignee: Pivotal Software, Inc., Palo Alto, CA (US)

( * ) Notice: Subject to any disclaimer, the term of this patent is extended or adjusted under 35 U.S.C. 154(b) by 977 days.

(21) Appl. No.: 14/621,331

(22) Filed: Feb. 12, 2015

Related U.S. Application Data

(60) Provisional application No. 61/939,706, filed on Feb. 13, 2014.

(51) Int. Cl.
*G06F 16/28* (2019.01)
*G06F 16/22* (2019.01)

(52) U.S. Cl.
CPC .............. *G06F 16/285* (2019.01); *G06F 16/2246* (2019.01)

(58) Field of Classification Search
CPC .......... G06F 17/30598; G06F 17/30327; G06F 17/30705; G06F 17/3053; G06F 17/30601; G06F 17/3061; G06F 17/30651; G06F 17/30716; G06F 16/285; G06F 16/2246
USPC ........ 707/738, 722, 737, 740, 749, 750, 797, 707/E17.058, E17.092, 999.01, 999.04, 707/999.05
See application file for complete search history.

(56) References Cited

U.S. PATENT DOCUMENTS

| | | | | |
|---|---|---|---|---|
| 8,385,662 B1* | 2/2013 | Yoon et al. | .......... | G06K 9/6247 382/156 |
| 9,060,018 B1* | 6/2015 | Yu et al. | ............... | H04L 63/102 |
| 2003/0167406 A1* | 9/2003 | Beavers | ............ | G06F 11/0709 726/22 |
| 2004/0059736 A1* | 3/2004 | Willse et al. | .......... | G06F 17/27 |
| 2004/0177053 A1* | 9/2004 | Donoho et al. | ........ | G06Q 40/00 706/47 |
| 2006/0020942 A1* | 1/2006 | Ly et al. | ............. | G06F 9/5027 718/100 |
| 2007/0112714 A1* | 5/2007 | Fairweather | ........... | G06F 8/427 706/46 |
| 2009/0327429 A1* | 12/2009 | Hughes et al. | ....... | G06Q 10/107 709/206 |
| 2010/0185984 A1* | 7/2010 | Wright et al. | ....... | G06T 11/206 715/833 |
| 2011/0182517 A1* | 7/2011 | Farsiu et al. | .......... | A61B 5/0066 382/190 |
| 2012/0137367 A1 | 5/2012 | Dupont et al. | | |

(Continued)

*Primary Examiner* — Tony Mahmoudi
*Assistant Examiner* — Kamal K Dewan
(74) *Attorney, Agent, or Firm* — Dinsmore & Shohl LLP

(57) ABSTRACT

Methods, systems, and apparatus, including computer programs encoded on computer storage media, for clustering and visualizing textual data. A data clustering and visualization system clusters large volumes of semi-structured and unstructured textual data into categories. Each category can include a group of similar alerts and incidents. The categories are then graphically presented.

19 Claims, 13 Drawing Sheets

(56) References Cited

U.S. PATENT DOCUMENTS

| | | | |
|---|---|---|---|
| 2013/0246319 A1* | 9/2013 | Tamayo et al. ...... G06Q 10/109 | 706/12 |
| 2014/0075327 A1* | 3/2014 | Noel et al. ............. G06F 9/542 | 715/744 |
| 2014/0101557 A1* | 4/2014 | Kelly ................... G06Q 10/10 | 715/734 |
| 2014/0164376 A1* | 6/2014 | Yang et al. ......... G06F 17/3071 | 707/737 |
| 2014/0214821 A1* | 7/2014 | Oliver et al. ..... G06F 17/30675 | 707/730 |
| 2014/0249799 A1* | 9/2014 | Yih et al. ............. G06F 17/277 | 704/9 |
| 2014/0280143 A1* | 9/2014 | Milenova et al. . G06F 17/30705 | 707/737 |
| 2014/0297640 A1* | 10/2014 | Duftler et al. ........... G06F 9/46 | 707/737 |
| 2014/0324866 A1* | 10/2014 | Tee et al. ............. H04L 41/065 | 707/737 |
| 2016/0164893 A1* | 6/2016 | Levi ................. H04L 63/1416 | 726/23 |
| 2018/0189990 A1* | 7/2018 | Cardno et al. ....... G06T 11/206 | |

* cited by examiner

CLUSTERING AND VISUALIZING ALERTS AND INCIDENTS

BACKGROUND

This specification relates to processing textual data.

Monitoring devices on a network of a system can generate volumes of alerts. These alerts can be semi-structured text messages. Technical or customer support staff can generate volumes of incidents. The incidents can be free-form or unstructured text. Conventionally, these alerts and incidents are manually examined and prioritized before being escalated for resolution.

SUMMARY

A data clustering and visualization system clusters large volumes of semi-structured and unstructured textual data into categories. Each category can include a group of similar alerts and incidents. The categories are then graphically presented.

A framework to cluster alerts and incident texts from IT (Information Technology) infrastructure components of large enterprises is disclosed. The framework can handle semi-structured alerts generated by IT infrastructure components such as storage devices, network devices, or servers. In addition, the frame work can handle alerts that include unstructured incidents text created manually by operations support personnel. A system implementing the framework performs tokenization, token normalization, stop word removal, distance metric computation, hierarchical clustering, and visualization as follows.

The system splits each alert, which is an instance of text data, into tokens, which are individual words. The system performs token normalization and stop word removal on the tokens. The system then represents each alert as a collection of tokens. The system compares each pair of alerts to determine a distance between the pair, the distance measuring similarity between two alerts. As a result, the system determines a distance matrix for the alerts. The system then performs a hierarchical clustering to group into a cluster those alerts that close to each other according to the computed distance matrix. The system visually represents the clusters to a system analyst in an intuitive way where words from similar alerts appear together visually, helping the system analyst to quickly understand a meaning of a group of alerts.

The framework is flexible enough to accommodate various distance metrics to compare alerts and various clustering approaches. For example, the system can perform top-down clustering using connected components and graph cut. Alternatively, the system can perform bottom-up clustering using minimax linkage. Based on the clustering output, the system can determine business intelligence metrics per cluster and visualize them. The business intelligence metrics can include key performance indicators.

Particular embodiments of the subject matter described in this specification can be implemented to realize one or more advantages. For example, information associated with clusters, e.g., cluster size or an exemplar in a cluster, can help a system analyst prioritize issues in IT infrastructure of an enterprise and improve reliability and availability of services provided by the enterprise.

Clustering and visually presenting alerts and incidents can help human decision makers to understand nature of the alerts and incidents, and to gain insights for improving operational efficiency.

Very few pairs of alerts and incidents are exactly alike. By clustering, the system can help a system analyst to understand structures of alerts and incidents. The system can be helpful in answering following exemplary questions.

What component of an IT infrastructure generates most alerts, and for what reason?

What are the number of alerts in a largest cluster? What category does that cluster belong? What is the trend of that cluster on a monthly basis?

What are the number of incident tickets per cluster and its trend on a monthly basis?

What are top-20 clusters in terms of number of alerts and incidents?

What are top-20 servers that are associated with the alerts and incidents?

What is the Mean-Time-To-Resolve (MTTR) for incidents in each cluster?

What are trends of number of incidents per cluster per month?

The method and system described in this specification allow IT operation staff to learn new meanings from their data. The clustering and visualization methods and systems are not limited to IT operation data. They can be textual data of various types outside of the IT domain.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTIONS OF DRAWINGS

Like reference numbers and designations in the various drawings indicate like elements.

DETAILED DESCRIPTION

Figure 1A:
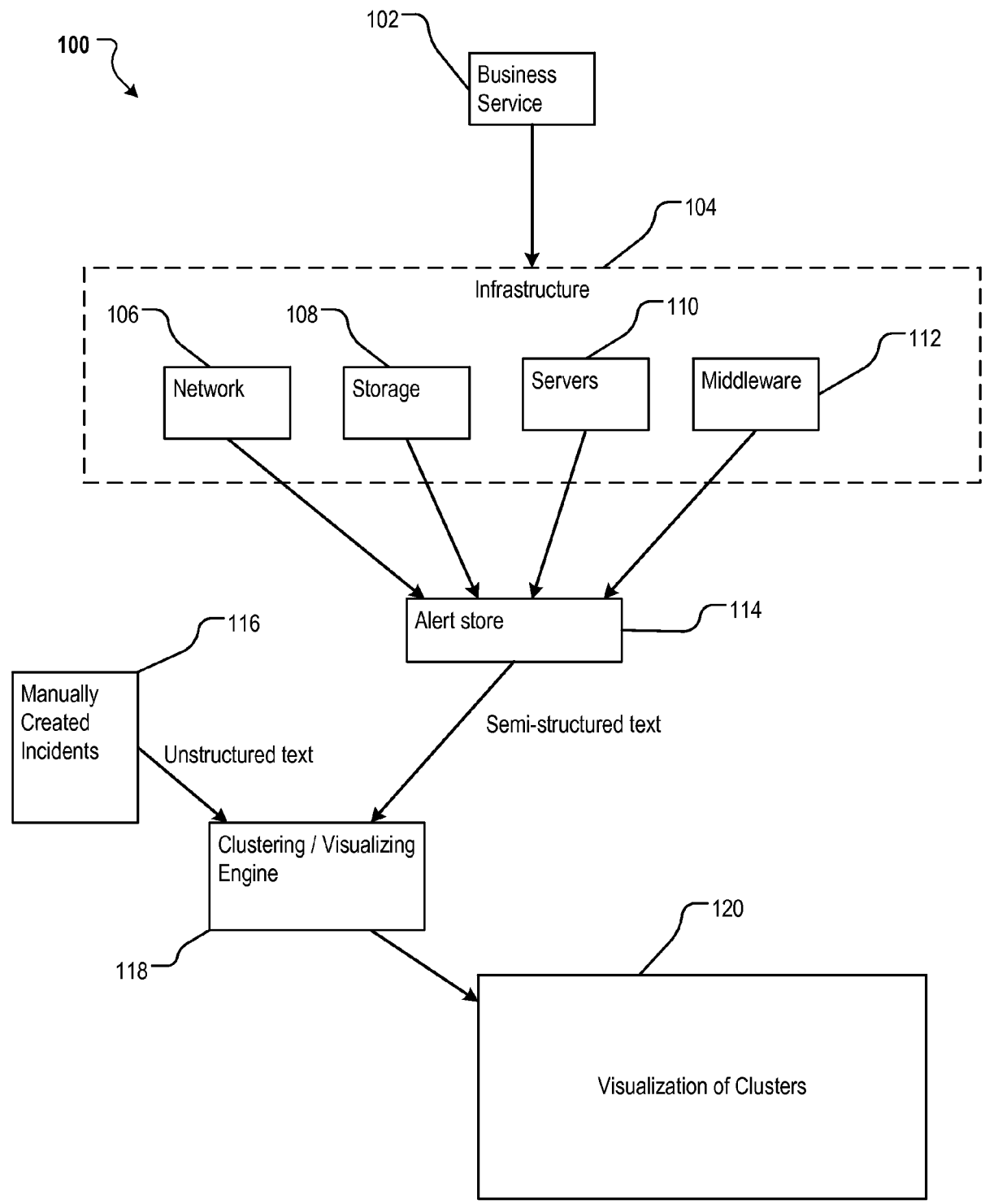
FIG. 1A is a block diagram illustrating an example system where alert and incident clustering is applied.

FIG. 1A is a block diagram illustrating an example system 100 where alert and incident clustering is applied. The system 100 provides a business service 102. The business service 102 can include, for example, credit and debit processing or fraud detection. An IT infrastructure 104 supports the business service 102. The IT infrastructure 104 can include, for example, one or more network devices 106, one or more storage devices 108, one or more servers 110, and various middleware 112. Each component of the IT infrastructure 104 can generate alerts. Each alert can be semi-structured text that conforms to some specific log format. For example, an alert A can be a text message "Service is not running at 10.2.34.56." A network management tool 114 can gather and store the alerts.

The system 100 includes a component that receives manually created incidents 116. Manually created incidents 116 can include text messages, e.g., a bug report email from internal staff, or a customer complaint from outside of the system 100. The text messages can have various forms.

The system 100 includes a clustering and visualizing engine 118. The clustering and visualizing engine 118 includes software executing on one or more processors and causes the one or more processors to cluster the semi-structured text and unstructured text to multiple groups. Each group includes a category of similar alerts or incidents. The clustering and visualizing engine 118 then creates visualizations 120 of the clusters. The visualizations 120 of the clusters can represent a size of each cluster, measured by number of alerts or incidents in the cluster. The visualizations 120 can include a representative message of each cluster, the representative message being one or more terms in the alerts or incidents in the cluster.

Figure 1B:
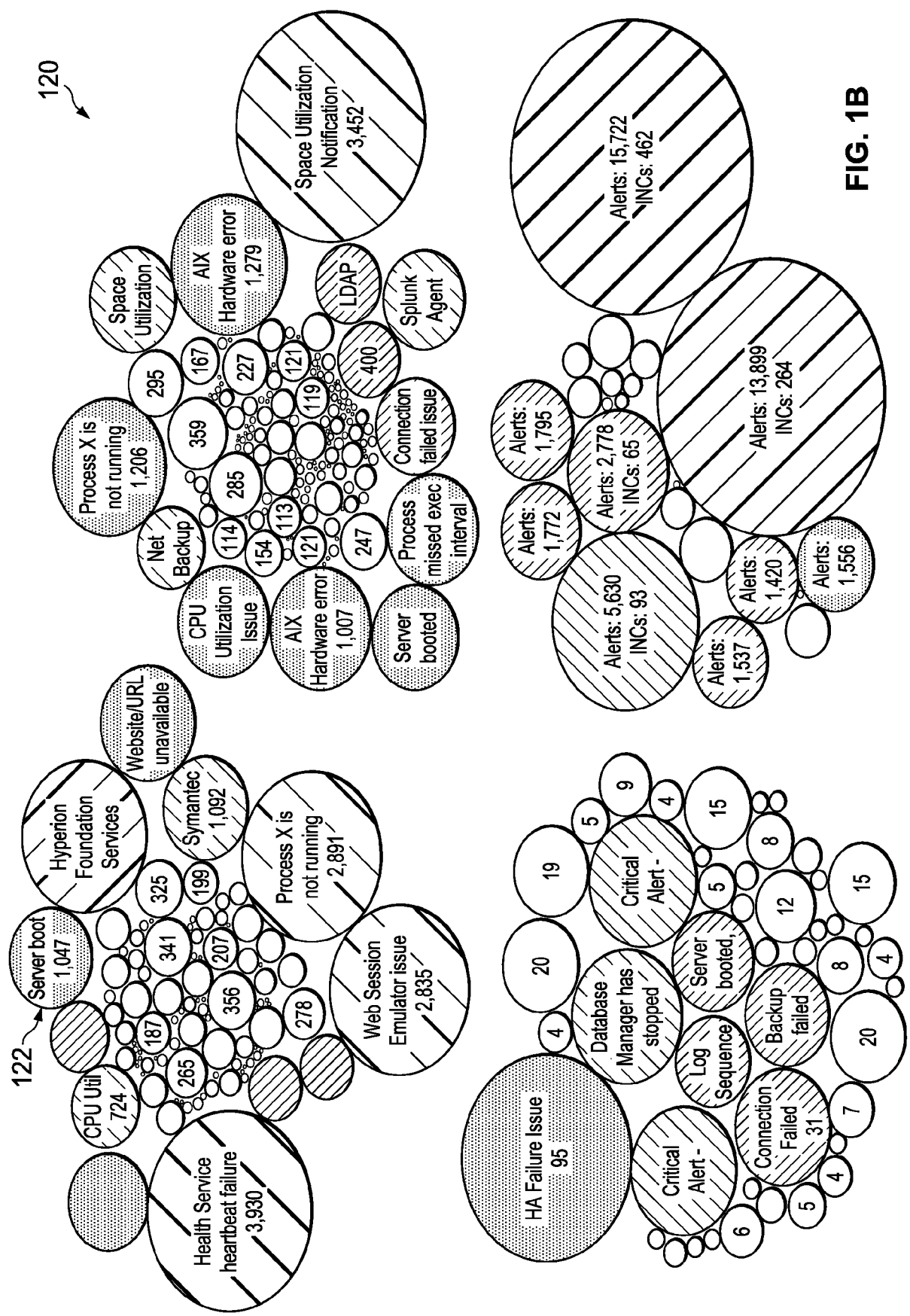
FIG. 1B is a diagram illustrating example visualizations.

FIG. 1B is a diagram illustrating example visualizations 120 of FIG. 1A. The diagram shows a visualization of clusters from each of four sub-groups 120a, 120b, 120c, 102d of alerts. The size of each bubble corresponds to the number of alerts belonging to the particular cluster. The visualizations 120 include, for example, a visualization 122 of a cluster that includes a representative text message, e.g., "Server boot," that is, for example, in the alert or otherwise representative of alerts in the cluster. The visualization 122 also includes a number, e.g., "1,047," that indicates how many times the alert "Server boot" occurred. The number of times the alert occurred can further be represented by a size of the visualization 122 relative to the sizes of other visualizations, as shown. In the diagram, the intensity of the coloring of the bubbles corresponds to the number of incident tickets created from the alerts of the corresponding cluster. For a darker color can indicate a higher number of incidents that were created from that cluster of alerts.

Figure 2:
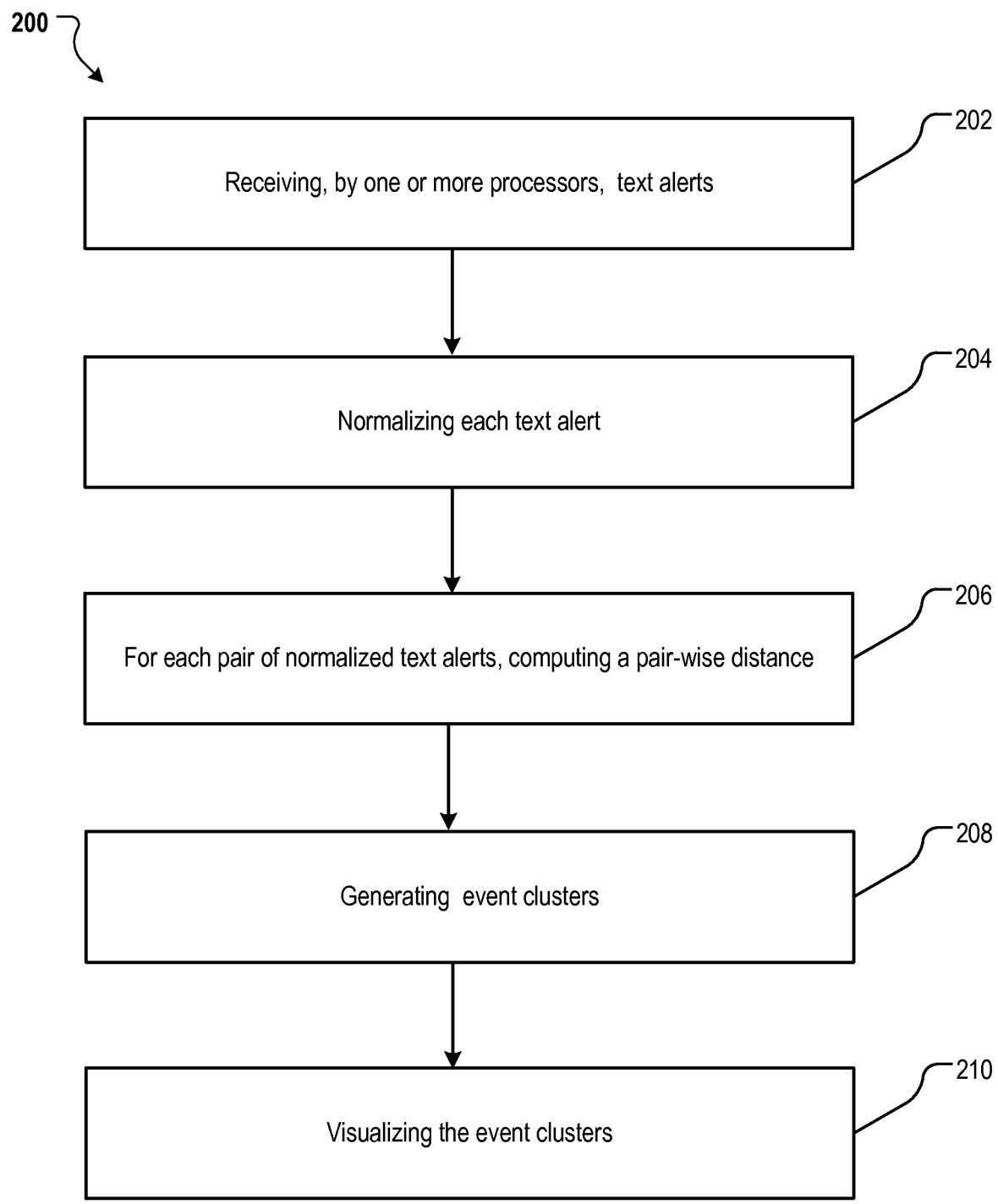
FIG. 2 is flowchart illustrating an example process of clustering semi-structured text.

FIG. 2 is flowchart illustrating an example process 200 of clustering semi-structured text. The process 200 can be performed by a system that includes the clustering and visualizing engine 118 (FIG. 1). The process 200 is a hierarchical clustering approach based on connected components detection and graph-cut.

The system receives (202) multiple text alerts. Each text alert describes an event occurring on a computer system. Each text alert can be a log message.

The system normalizes (204) the text alerts, including performing token normalization by replacing a variable value with a variable name in each text alert and stop word removal by removing terms designated as stop words.

In token normalization, some of the specific details in the text alerts are either removed or replaced by another common string. For instance, two text alerts A and B may report some issue at specific IP address (e.g., Alert A: service is not running at 10.2.34.56 and Alert B: service is not running at 10.12.2.54). In clustering the content of these two text alerts, the specific IP address (e.g., 10.12.2.54) in the text alert string is not important. By replacing the IP address with a string "IP_address" (service is not running at IP address), both of these text alerts are represented by the same text. Similarly, the system searches and replaces the following example text fields to bring together alerts that originally appeared to be very different.

Replace various date formats with the text date
Replace various time formats with the text time
Replace various URLs with the text url
Replace various file paths with the text filepath
Replace various server (node) names with nodename
Remove punctuations
Replace numbers with # symbol.

Stop words are words that commonly occur in all of the alert groups. These are present in almost all of the text alerts. In addition, every text alert originating from a particular logging software may be prefixed by some identifier of the software. In order to cluster text alerts logged by a particular software based on their content, the prefix may be considered as a stop word and removed. To identify the stop words, the system can perform the following operations:

Split the alerts text into unigrams (words or tokens)
Compute unigram counts across all alerts.
Choose top "k" words with most counts as stop words and remove them from the alerts.

For each pair of normalized text alerts, the system computes 206) a pair-wise distance, wherein each pair of text alerts is made up of two text alerts in the plurality of text alerts, and the pair-wise distance is a measure of a degree of similarity between the two text alerts in the pair.

Before the system performs clustering, the system compares any two token-normalized text alerts. The system can use Jaccard distance as a metric to compare any two token-normalized text alerts. In order to compute Jaccard distance, each token-normalized text alert is represented as a bag of words. For example, the system denotes one such set from token-normalized text alert A as set_A and another set of words from token-normalized text alert B as set_B. Then, the system calculates the Jaccard distance as follows.

Jaccard_distance(set_A, set_B) = 1 - (cardinality of (set_A intersection set_B)/ cardinality of (set_A union set_B))

The Jaccard distance so calculated is a number between 0 and 1 and is not sensitive to the position of any matching words in the two alerts that are being compared.

The system generates (208) multiple event clusters from the normalized text alerts, wherein each event cluster includes a group of text alerts, each pair of text alerts in the group having a pair-wise distance that is shorter than a clustering threshold distance. Generating the event clusters can include the operations of representing each normalized text alert as a node in a graph; connecting each pair of nodes by an edge upon determining that a pair-wise distance between text alerts represented by the pair of nodes is less than the clustering threshold distance; then detecting a plurality of groups of connected nodes in the graph. For a subset of the groups that include largest numbers of connected nodes, the system performs graph cutting to reduce sizes of the subsets of groups. The system designates each group of connected nodes, including the subset of groups on which graph cutting has been performed, as an event cluster.

After token normalization and stop word removal, the number of unique text alerts has been reduced, which enables the system to find clusters within them.

For each of these alert groups, the system create a N x N distance matrix using the Jaccard distance metric to compare any two token-normalized text alerts. Here N is the number of unique token-normalized text alerts within each group. Given this distance matrix, the system finds smaller clusters within each alert group by applying a top-down hierarchical clustering based on based on Connected Components Detection and Graph-Cut.

The system then visualizes (210) the clusters by presenting the clusters in a graphical user interface.

Figure 3:
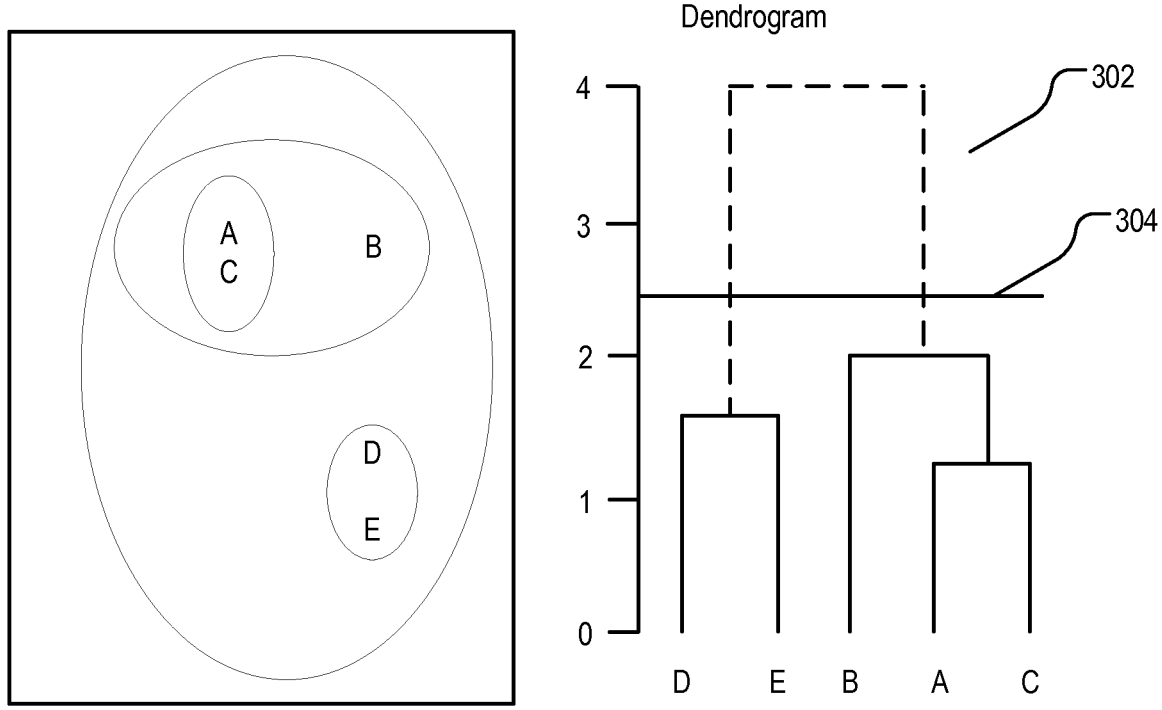
FIG. 3 is diagram illustrating example agglomerative hierarchical clustering techniques.

FIG. 3 is diagram illustrating example hierarchical clustering techniques. The system builds example dendrogram 302 of text alerts A, B, C, D, and E. The dendrogram 302 can have a tree structure of the text alerts A, B, C, D, and E, the high of the tree being a distance between the text alerts. Initially, each of text alerts A, B, C, D, and E is 20 its own cluster. The system then merges similar items, each item being a text alert or a cluster. Items are similar when a distance between them is less than a threshold. The system then cuts (304) the tree at certain height to create the clusters.

Figure 4:
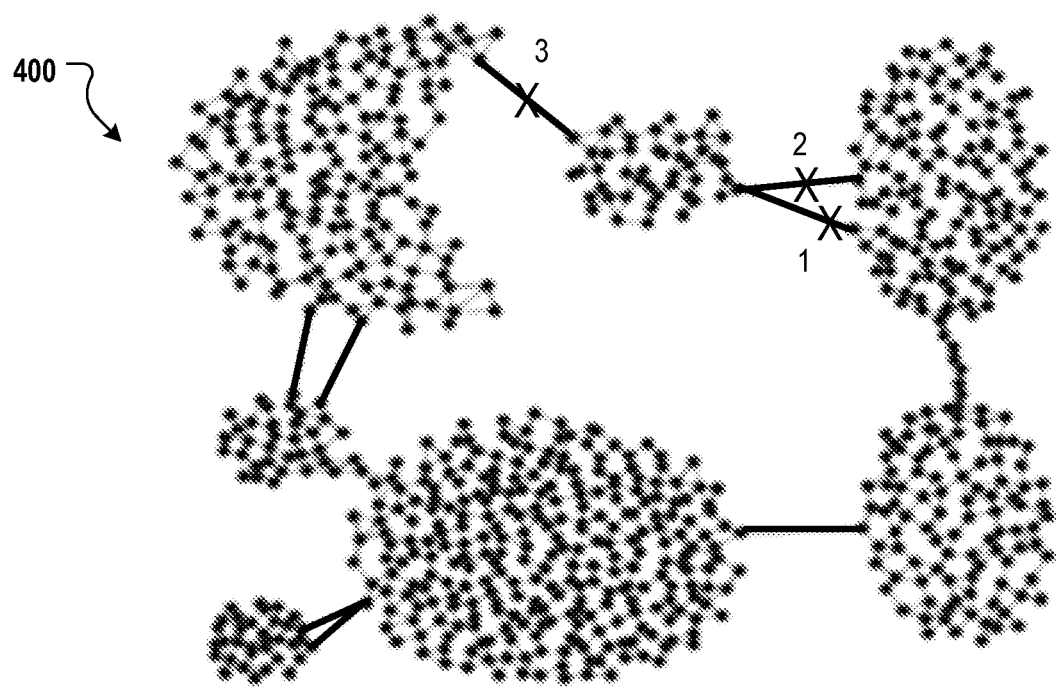
FIG. 4 is a graph illustrating example techniques of identifying clusters.

FIG. 4 is a graph illustrating example techniques of identifying clusters. The system builds a graph 400 using pairwise distance metric. In graph 400, each text alert is represented as a node. High similarity between nodes, which is where distance between the text alerts represented by the nodes is shorter than a threshold, triggers the system to connect the nodes with an edge. The system then detects connected components from the graph 400 to identify clusters. The system can cut some edges between clusters, e.g., cuts 1, 2, and 3 shown on the figure, using graph cutting techniques that are described in detail in reference to FIG. 6.

Figure 5:
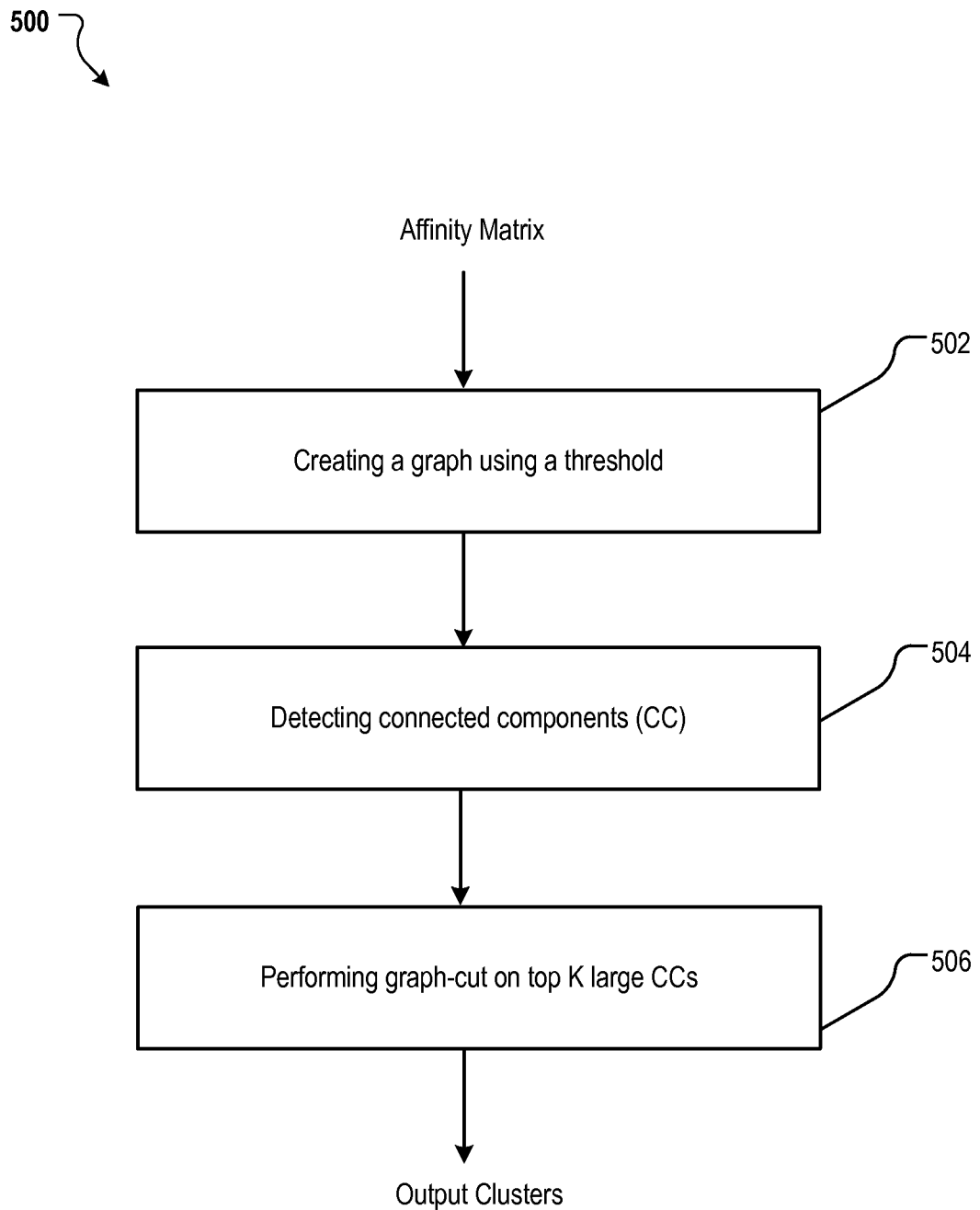
FIG. 5 is flowchart illustrating an example process of identifying clusters.

FIG. 5 is flowchart illustrating an example process 500 of identifying clusters. The system receives an affinity matrix as input, and creates (502) a graph using a threshold value. The affinity matrix is an N x N distance matrix. The system can create a graph where the vertices of the graph correspond to text alerts. The system can establish an edge between any two vertices (token-normalized text alerts) if the distance, e.g., Jaccard distance, between the two token-normalized text alerts is less than a threshold (e.g., 0.5).

After creating this graph, the system detects (504) connected components by running a connected components detection algorithm on it to identify parts of the graph that are connected to other parts or not connected to other parts. A connected component is a sub-graph in which there exists at least one path that connects any two vertices, and which is connected to no additional vertices in the complete graph. An advantage of using connected components is that it doesn't assume any cluster shape.

It may so happen that some of the connected components detected by the system are much larger than others, and it is desirable to break these connected components into smaller components. Toward this, the system runs (506) a graph cut algorithm that employs normalized cut, which can be a hierarchical graph partitioning algorithm. The system can run the graph cut against top K number of connected components.

Figure 6:
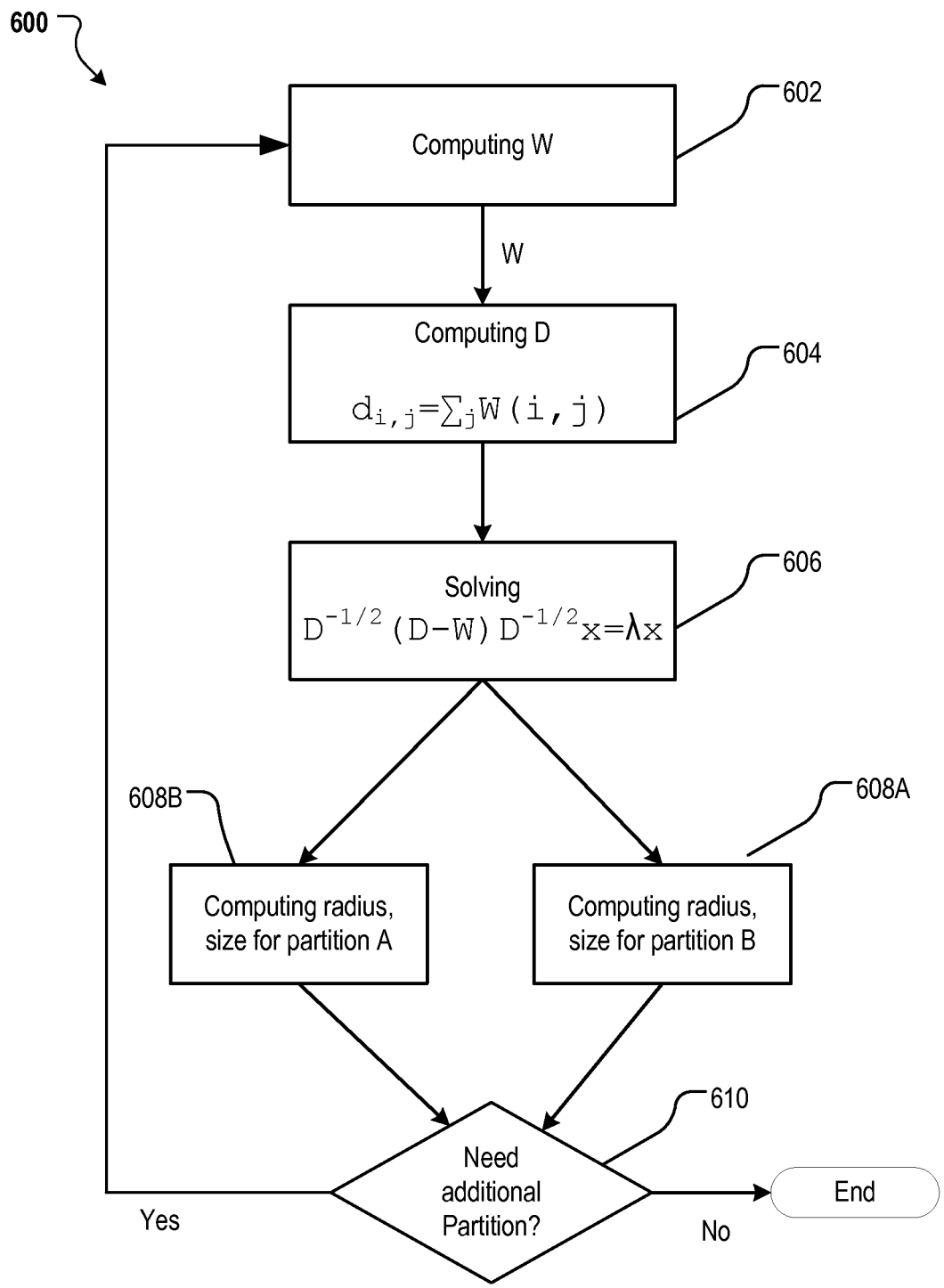
FIG. 6 is flowchart illustrating an example process of graph cutting.

FIG. 6 is flowchart illustrating an example process 600 of graph cutting. Some of the clusters generated through connected components may be too big. The system can reduce sizes these big clusters by graph cutting. From an N-by-N ("N x N") distance matrix ("C") of a connected component, the system computes (602) an affinity matrix W of the same size as the distance matrix C where $W = \exp(-C/\text{sigma}^2)$. Here sigma is a parameter that controls how quickly affinity (similarity) falls off with distance.

The system then computes (604) a diagonal degree matrix D whose diagonal elements are $d_{i,i} = \Sigma_j W(i,j)$, for i=1, .., n.

The system solves (606) the following eigen system: $D^{-1/2}(D-W) D^{-1/2}x = \lambda x$ where x is a cluster indicator vector that partitions the input graph into two parts A and B such that within-cluster affinity is maximized while between cluster-affinity is minimized.

The system computes (608A and 608B) cluster radii for the new partitions A and B and their sizes.

Figure 7A:
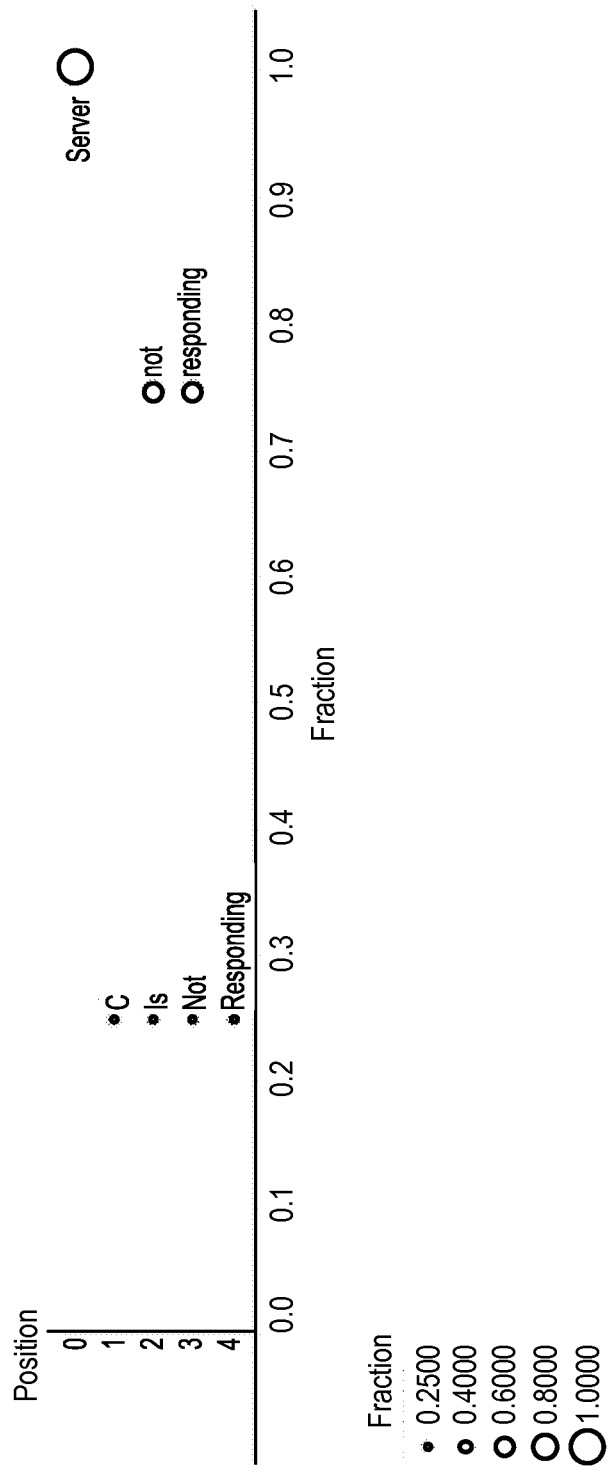
FIG. 7A is an example visualization of terms in semi-structured text.

The system then determines (610) whether A or B needs additional partition. If for A or B cluster radius > radius_threshold_1 and cluster_size > size_threshold_2, then the system continues partitioning either A or B recursively FIG. 7A is an example visualization of terms in semi-structured text. It can be challenging to visualize clustered or grouped semi-structured text data such as alerts. Techniques such as word clouds are often used to visualize text data. Word clouds do not reveal any structure that is common across alerts. For example, consider the hypothetical example of alerts shown in Table 1.

TABLE 1

| Example semi-structured text data (alerts) | |
|---|---|
| Alert # | Text |
| Alert 1 | Server A not responding |
| Alert 2 | Server B is not responding |
| Alert 3 | Server C not responding |
| Alert 4 | Server D not responding |

Word clouds would only pick out the fact that the words "Server", "not" and "responding" occur very often in the set of alerts above. Word clouds would not be able to pick out that the most common structure across alerts is "Server __ not responding" with words in that order. In order to reveal that underlying structure, the system visualizes each cluster of text alerts as follows.

The system first generates unigrams for each element of the cluster and record the tuple, (word, position), comprising the word and its position in that element. Prior to generating the tuples, the system can left-justify or right-justify the text in each element of the cluster or group depending on whether the need is to visualize the word order from left-to-right or right-to-left. For example, words and their positions are shown below for the hypothetical alerts from Table 1 (left- and right-justified).

TABLE 2

Table showing words and their position in hypothetical semi-structured text. The top panel shows data for left-to-right word order and the bottom panel shows data for right-to-left word order

| Alert # | Word Position | | | | |
|---|---|---|---|---|---|
| | 0 | 1 | 2 | 3 | 4 |
| Alert 1 | Server | A | not | responding | |
| Alert 2 | Server | B | is | not | responding |
| Alert 3 | Server | C | not | responding | |
| Alert 4 | Server | D | not | responding | |

| Alert # | Word Position | | | | |
|---|---|---|---|---|---|
| | 4 | 3 | 2 | 1 | 0 |
| Alert 1 | | Server | A | not | responding |
| Alert 2 | Server | B | is | not | responding |
| Alert 3 | | Server | C | not | responding |
| Alert 4 | | Server | D | not | responding |

Then, for each cluster, the system records all (word, position) tuples and a count of how many times that tuple occurs over all the elements in the cluster or group. Using the count also compute the fraction of elements in which the given (word, position) tuple occurs. Continuing the above example the result of this step for the top panel of Table 2 is shown in Table 3.

TABLE 3

The result of applying Step 2 of the visualization process to the data in the top panel of Table 2

| Word | Position | Count | Fraction |
|---|---|---|---|
| Server | 0 | 4 | 1 |
| A | 1 | 1 | 0.25 |
| B | 1 | 1 | 0.25 |
| C | 1 | 1 | 0.25 |
| D | 1 | 1 | 0.25 |
| not | 2 | 3 | 0.75 |
| Is | 2 | 1 | 0.25 |
| responding | 3 | 2 | 0.75 |
| not | 3 | 1 | 0.25 |
| responding | 4 | 1 | 0.25 |

Next, the system visualizes the counts or percentages for (word, position) tuples with a bar chart or similar. FIG. 7A shows a plot for the example from Tables 1, 2 and 3. The vertical axis in the figure represents the position of the word in the elements of the cluster/group and the horizontal axis represents the fraction of elements in the cluster that have that (word, position) tuple. Each circle in the figure represents a word. Multiple words can be found at each position. Reading the words with high ratio of occurrence in the figure we see the following common structure in the alerts: "Server ____ not responding".

Figure 7B:
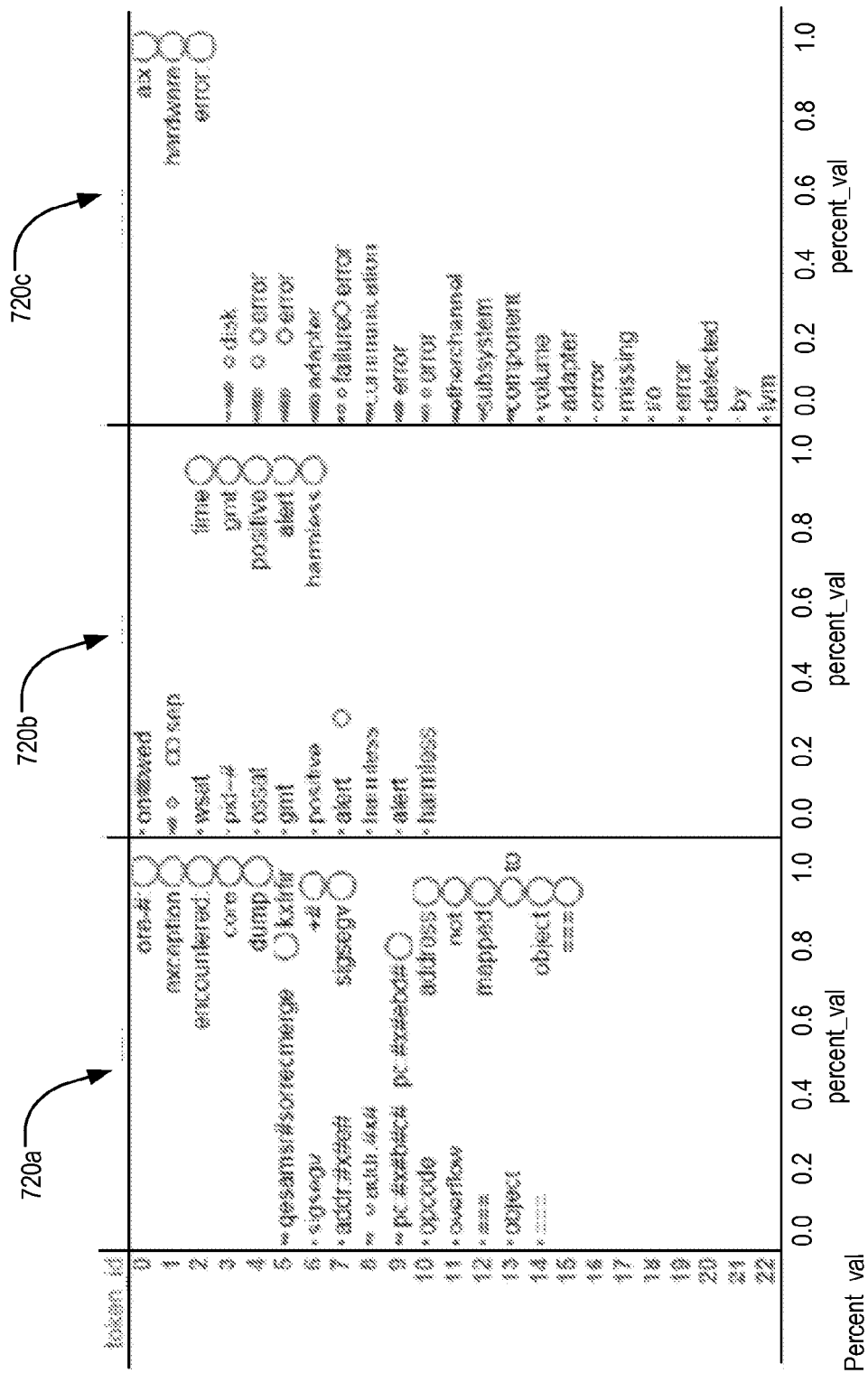
FIG. 7B is an example visualization of multiple clusters.

FIG. 7B is an example visualization of multiple clusters. Three clusters 720a, 720b, 720c are shown. Each element in an alert is visualized using a respective circle. A size of a circle represents a fractional value, e.g., the "fraction" value corresponding to that element. A larger size corresponds to a higher fractional value. The legend "Percent_val" of FIG. 7B illustrates correspondence between a size of a circle and a respective fractional value. In addition, a position of a circle in each cluster represents the fractional value. Position more to the right corresponds to a higher fractional value. Accordingly, elements having like fractional values can be placed in like positions in cluster 720a, 720b, and 720c, to allow a user to quickly grasp the most important elements in each cluster. Reading the alerts with high percent occurrence off the figure allows a user or s system to see the following elements are common to many elements within their respective cluster:

a. "ora#: exception encountered: core dump ... address not mapped to object"
b. "... time gmt positive alert harmless ..."
c. "aix hardware error: ..."

The sizes and positions of representations of elements of visualization can automatically generate a meaning of each cluster.

Figure 8:
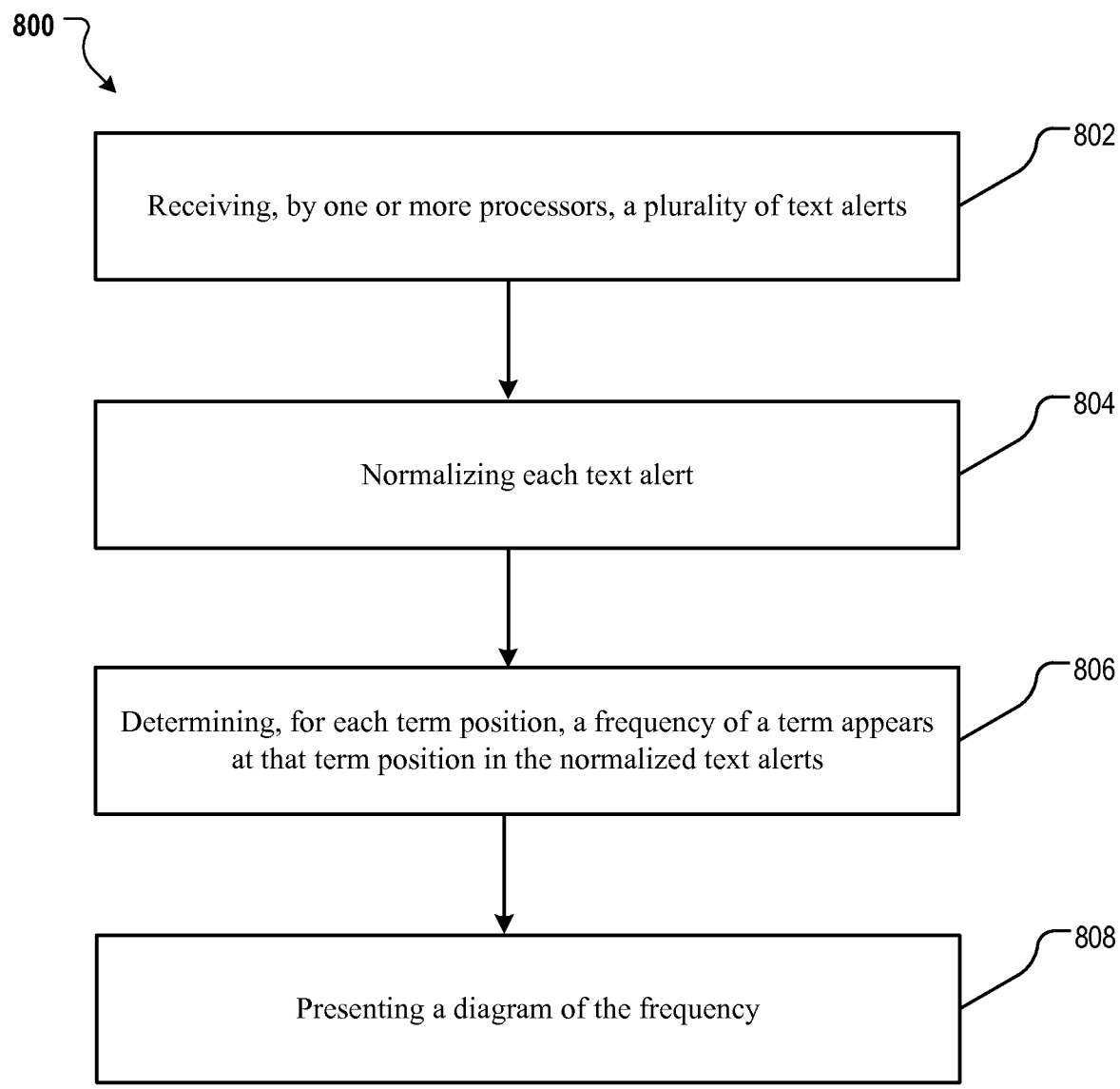
FIG. 8 is a flowchart illustrating an example process of visualizing semi-structured text.

FIG. 8 is a flowchart illustrating an example process 800 of visualizing semi-structured text. The system receiving (802) multiple text segments, each text segment corresponding to an incident that occurred in a system. The system normalizes (804) each text segment, including replacing a variable value with a variable name in each text segment and removing from each text segment terms designated as stop words.

The system determines (806), for each term position, a frequency of each term that appears at that term position in the normalized text alerts. Each term position is a position in which a term appears in a left-justified or right-justified normalized text alert. Each frequency is a count or a ratio of a particular term appearing in the normalized text alerts at that position.

The system then presents (808) a diagram of the frequency, wherein frequencies of multiple terms form a dimension of the diagram and ordered term positions forms another dimension of the diagram. In the diagram, the system can group terms appearing at adjacent positions and providing the groupings for display.

Figures 9, 10:
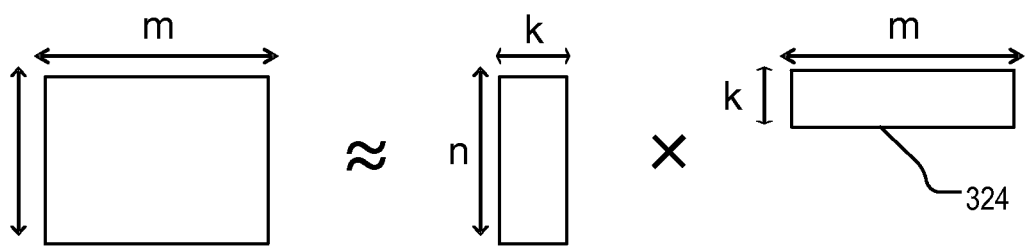
FIG. 9 illustrates an example binary term-incident matrix for clustering unstructured textual data.
FIG. 10 illustrates example techniques of factorizing a term-incident matrix.

FIG. 9 illustrates an example binary term-incident matrix 900 for clustering unstructured textual data. For unstructured data, the system generates clusters using matrix factorization and K-D trees. The system constructs construct feature vectors of the token-normalized text incidents. Using bag-of-words representation, the system collects an entire set of token-normalized text incidents in a binary matrix, designated as the term-incident matrix 900. Each row represents a term that is a word, and each column represents a token-normalized text incident, with the value 1 indicating the presence of a term; 0 otherwise. As shown in FIG. 9, the term-incident matrix 900 is sparse. The system then projects the binary term-incident matrix 900 to a lower-dimensional space to obtain a more compact representation. The projection is done via matrix factorization.

FIG. 10 illustrates example techniques of factorizing a term-incident matrix. Matrix A is an N x M matrix having N rows and M columns. Matrix A can be the term-incident matrix 900 of FIG. 9. By factorization, the system decomposes matrix A into two matrices: matrix F of size N x k and matrix G of size k x M. The rank of the factors, k, can be a user-specified parameter. The system can use a k value that is much smaller than N and M. The resulting matrices F and G can provide a condensed summary of the data in matrix A. The system can choose the k value to minimize an objective function that measures the discrepancy between matrix A and the approximation FG. The system can use an objective function is the squared Frobenius norm of a difference between matrix A and the approximation FG.

Figures 11, 12:
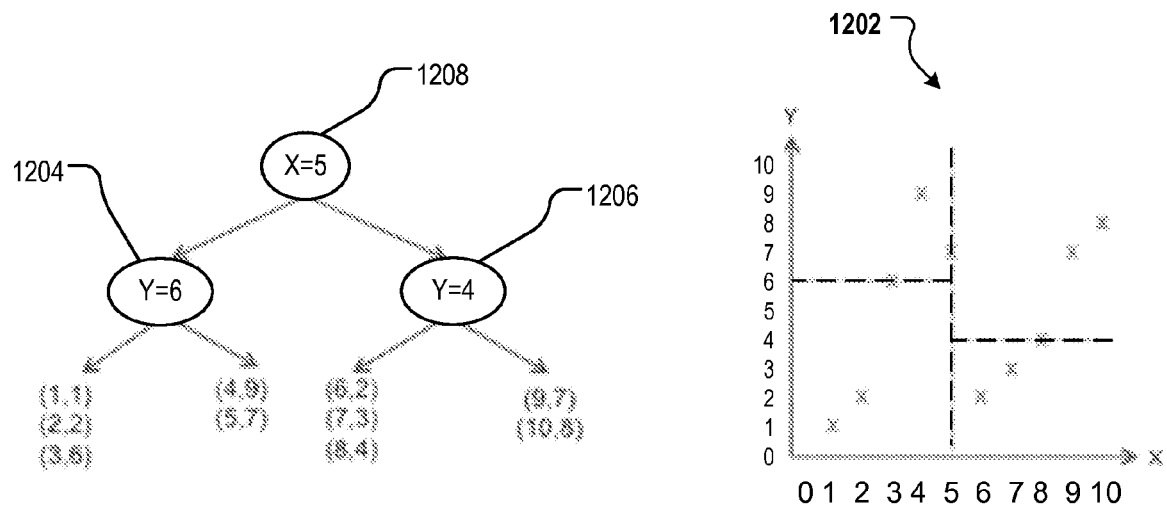
FIG. 11 illustrates an example low-rank matrix factorization.
FIG. 12 illustrates an example K-D tree representing groups of data.

FIG. 11 illustrates an example low-rank matrix factorization. In the example, the system factorizes a 6 x 4 matrix into two rank-2 matrices. The R matrix on the right hand side shows the residual.

In some implementations, the system uses non-negative matrix factorization (NMF) to factor matrix A, during which the system forces F and G to contain only non-negative elements. Given a non-negative term-incident matrix A, the system solves the following optimization problem.

$$\min \|A - FG\|_F^2,$$

subject to $$F_{ij} \geq 0, G_{ij} \geq 0 \text{ for all } i, j, \quad (1)$$

where $\|\cdot\|_F$ denotes the Frobenius norm of a matrix. The above problem is non-convex in both F and G, but becomes a convex problem when F or G is fixed. The system can use an Alternating Least Squares (ALS) to solve problem (1).

1. Start with a random F.
2. Fix F, solve $\min\|A - FG\|_F^2$ for G.
3. Set all G_ij < 0 to zeros.
4. Fix G, solve $\min\|A - FG\|_F^2$ for F.
5. Set all F_ij < 0 to zeros.
6. Repeat steps 2-5 until a convergence criterion is met.

List 1: Alternating Least Squares for NMF

Starting with a random F, the system first finds the best G that minimizes the approximation error (in the Frobenius norm), followed by a truncation operation to ensure non-negativity. Similarly, given the current G, the system updates F via a two-step procedure. The system proceeds in an alternating fashion until a convergence criterion is met. Close-form solutions are possible: when F is fixed, the system can compute an optimal G as $(\text{inv}(F^TF)F^TA)$; when G is fixed, the system can compute an optimal F as $\text{inv}(GG^T)AG^T$, where $\text{inv}(\cdot)$ denotes a pseudo-inverse of a matrix. Generally, matrix inversion is computationally expensive. But, here the cost of inverting $(F^TF)$ and $(GG^T)$ is negligible since they are both matrices of size k x k, where k is small.

To analyze its convergence, the system can monitor changes in the elements of F and G, and stop the algorithm when changes fall below a pre-specified threshold, or the maximum number of allowed iterations is reached.

Due to the non-convex nature of the NMF problem, different initializations can lead to different factors. The system can initialize each column of F by averaging a certain number of random columns from A.

The low-rank factor G effectively characterizes token-normalized text incidents in a k-dimensional space. Each column of G can be treated as a feature vector of the corresponding token-normalized text incident. The system can use a K-D tree data structure to organize the feature vectors in a way that facilitates the derivation of high-level groups of token-normalized text incidents.

FIG. 12 illustrates an example K-D tree representing groups of data. Given the low-rank factor G, the system can organize the columns of G in a K-D tree. K-D tree is a data structure that can be used for searching nearest "neighbors" in a k-dimensional space. The system can use a K-D tree to partition k-dimensional data into non-overlapping subsets designated as sub-trees, such that data points within a sub-tree are more likely to be neighbors of each other. The system can thus use a K-D tree to encode groupings of data. The system can construct a K-D tree in a recursive manner. For example, in an exemplary two-dimensional space 1202, the system can choose a dimension (e.g., X). The system then finds a median along that dimension. The system splits data at a median into sub trees 1204 and 1206, and repeats the choosing, finding, splitting in each sub tree. The system can implement the K-D-tree data structure and the process of generating the K-D tree in a parallel processing database. The process executes recursively in the database on the feature vectors of token-normalized text incidents produced by NMF until all sub-trees reach a pre-determined size.

Having constructed a K-D tree 1208, the system performs hierarchical clustering within each sub-tree to obtain a more precise grouping of token-normalized text incidents. Using hierarchical clustering, the system organizes data in a tree structure represented by a dendrogram (FIG. 3), with each leaf note representing a data point and each interior node representing a cluster of points. Agglomerative hierarchical clustering builds a clustering tree from bottom up by merging closest clusters. Hierarchical clustering does not require the number of clusters to be specified a priori. Instead, the system can decide at what height to cut a clustering tree based on user input, which indirectly determines the number of clusters. For example, the horizontal line in FIG. 3 cuts the dendrogram to three clusters.

Hierarchical clustering operates on pairwise distances. To measure pairwise distances between summaries, the system performs calculation as follows $$dist(A, B) = \max_i |X_i| - |A \cap B|, \quad (2)$$

where $X_i$, A, and B are sets of distinct words in a token-normalized text incident, and $|\cdot|$ denotes the cardinality of a set. The first term, $\max_i|X_i|$, is a constant, which is a cardinality of a largest token-normalized text incident. By using this term, the system ensures positivity of the distance measure. This distance measure is based on the intersection of text incidents. The system can exclude text lengths from measurement. This is motivated by the observation that text incidents of the same issue can vary widely in length. For instance, the two examples below both describe a password related issue, but one is brief, while the other contains many more details:

Incident 1: My fundamo account password did not work on the following servers which prevented me from resetting the root password. Once my personal account password issue is resolved, I will reset the root account passwords for SPP-SRV1, SPP-SRV2 and apacdeploy.

Incident 2: SQL Password Reset

The system is configured to determine that the distance between the two incidents is not affected by the difference in length of each incident.

Figure 13:
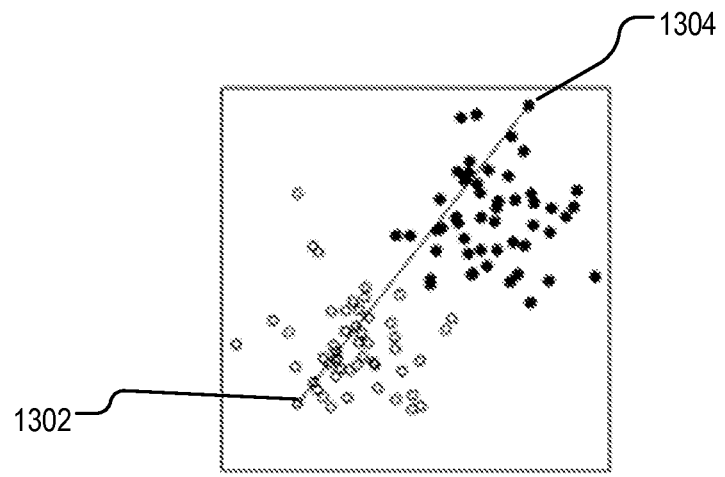
FIG. 13 illustrates example complete-linkage distance between two clusters.

FIG. 13 illustrates example complete-linkage distance between two clusters. For clustering, the system uses a complete-linkage method. The complete-linkage method is an agglomerative hierarchical clustering method that defines the distance between two clusters by the furthest pair of data points 1302 and 1304. Combined with the intersection-based distance measure (2), complete-linkage clustering ensures that each pair of token-normalized text incidents in a cluster shares at least certain number of words.

The system can implement the complete-linkage method in a parallel processing database, using a hierarchical clustering database function, e.g., in an R Procedural Language (PL/R). The system executes the database function on all sub-trees of token-normalized text incidents simultaneously using a "GROUP BY" function of the parallel processing database. The system then cut resulting clustering trees at a height to ensure a certain degree of overlap between each pair of token-normalized text incidents in a cluster. For example, when the maximum length of a token-normalized text incident is $30 \left( \max_i |X_i| = 30 \right)$, then, by setting the height to 28, the system guarantees an overlap of at least 2 words between any two token-normalized text incidents from the same cluster.

Figure 14:
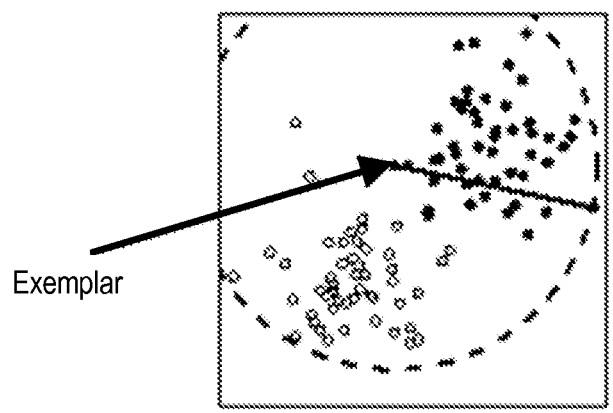
FIG. 14 illustrates techniques of determining an exemplar of a cluster.

FIG. 14 illustrates techniques of determining an exemplar of a cluster. The system can select an exemplar of a cluster to represent a typical look and feel of the cluster. The exemplar is a token-normalized text incident in a cluster. The system can determine a token-normalized text incident that has the shortest distance to its farthest neighbor, and designate that token-normalized text incident as the exemplar of the cluster.

Due to the variability of token-normalized text incidents, the system can assign a same type of token-normalized text incidents to different sub-trees, or to different clusters within a same sub-tree. The system can perform refinement to merge those similar clusters.

First, the system extract frequently used words (e.g. top-10 words) from each cluster to form a feature vector of a cluster. The system then uses intersection-based distance measure (2) to quantify the similarity or dissimilarity between two clusters. Given pairwise distances of clusters, the system can use complete-linkage clustering method to create groups of clusters. For each merged cluster, the system selects a representative incident as shown in FIG. 14. The system can use this refinement procedure joins a large portion of clusters produced by the initial run of clustering.

Since comparing every possible pair of clusters can be computationally expensive, in some implementations, the system computes pairwise distances between clusters that share at least N top words, e.g., two top words. The threshold N can be adjusted to reduce computational costs.

Figure 15:
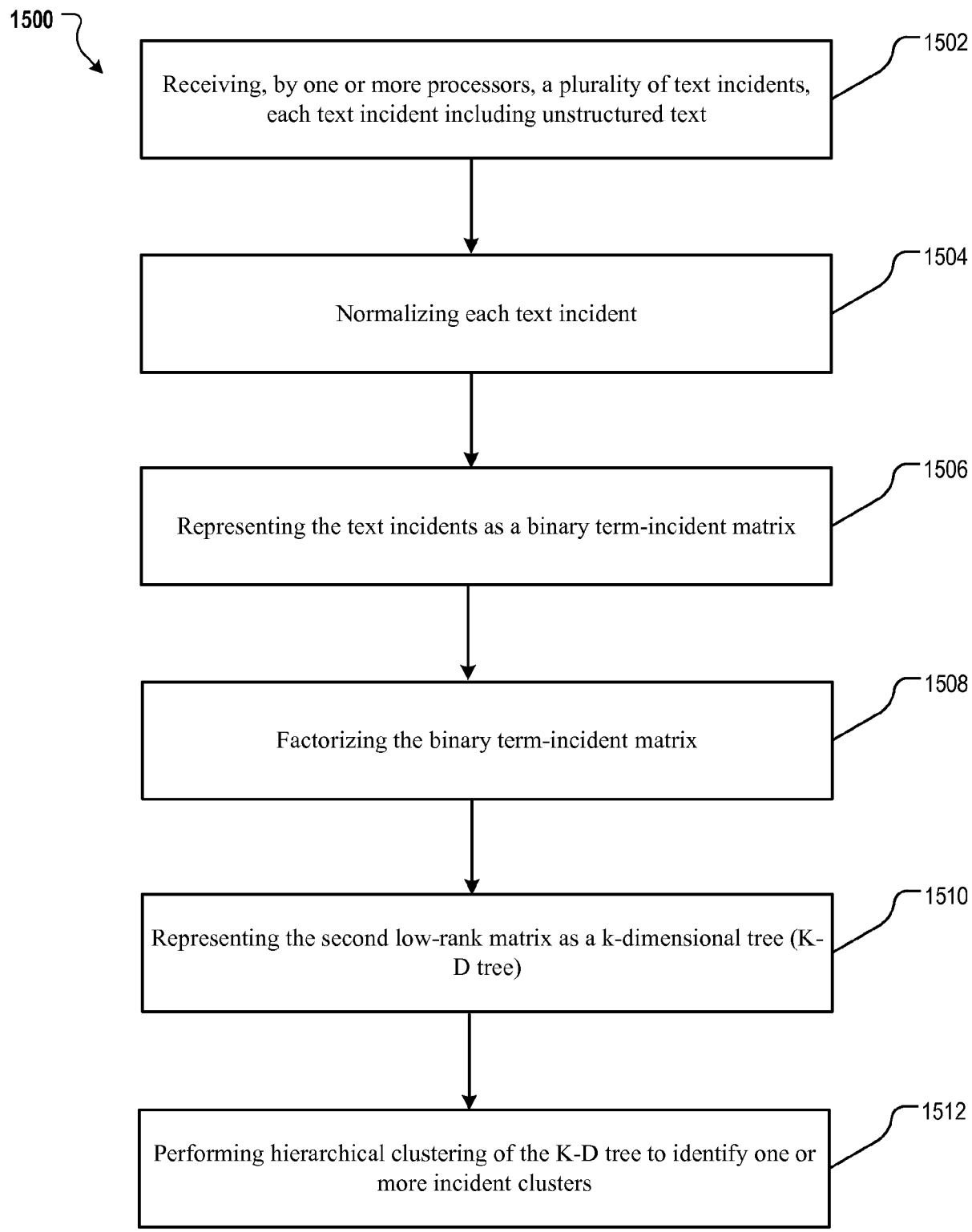
FIG. 15 is a flowchart illustrating an example process of clustering unstructured text.

FIG. 15 is a flowchart illustrating an example process 1500 of clustering unstructured text. The system receives (1502) multiple text incidents, each text incident including unstructured text.

The system normalizes (1504) each text incident, including replacing a variable value with a variable name in each text incident and removing from each text incident terms designated as stop words. Normalization can be the same as normalization 204 (FIG. 2), except that the system removes timestamps, file paths, URLs, punctuations, and digits from the text, instead of being replaced by common strings. This is based on the observation that unlike the semi-structured text alerts, unstructured text incidents generally do not conform to certain formats, hence semantically non-meaningful strings like timestamps and file paths are unlikely to contribute to the formation of clusters. In addition, the system also removes common English stop words such as articles and transitive verbs, as well as a custom list of words from the unstructured text incidents to further clean the data.

The system represents (1506) the text incidents as a binary term-incident matrix having a first dimension and a second dimension. The first dimension corresponds to the text incidents. The second dimension corresponds to terms in the normalized text incidents. Each element in the matrix represents whether a term appears in a corresponding normalized text incident.

The system factorizes (1508) the binary term-incident matrix into a first low-rank matrix and second low-rank matrix each having a smaller size than size of the binary term-incident matrix. A column dimension of the second low-rank matrix corresponds to the text incidents.

The system can represent (1510) the second low-rank matrix as a K-D tree that partitions the second low-rank matrix into non-overlapping subsets.

The system performs hierarchical clustering (1512) of the K-D tree to identify one or more incident clusters, each incident cluster comprising a group of normalized text incidents. The system performs the hierarchical clustering using a parameter of a pair-wise distance between each pair of normalized text incidents. The system determines the pair-wise distance between a pair of a first normalized text incident and a second normalized text incident by determining a first cardinality of a largest text incident as measured by number of terms. The system then determines a second cardinality of an intersection of the first normalized text incident and the second normalized text incident, the intersection being a set of terms that appear in both the first normalized text incident and the second normalized text incident. The system designates a difference between the first cardinality and the second cardinality as the pair-wise distance between the first normalized text incident and the second normalized text incident.

In some implementations, the system designates a centroid text incident in each incident cluster as an exemplar of the incident cluster that textually represents the incident cluster. The system can determine the centroid by identifying a normalized text incident in each cluster that has a shortest distance to a farthest neighbor of that normalized text incident.

In some implementations, the system merges multiple incident clusters into an aggregated cluster based on most frequently used terms in each incident cluster. The system determines, for each incident cluster, a most frequently used term list that includes a pre-determined number of unique terms. The system then calculates a distance between each pair of incident clusters using a cardinality of an intersection between most frequently used term lists of the pair of incident clusters, where a larger intersection corresponds to a shorter distance. The system then merges the multiple incident clusters upon determining that distances between each pair of incident clusters are less than a threshold.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communications network. Examples of communications networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. For example, the subject matter is described in context of scientific papers. The subject matter can apply to other indexed work that adds depth aspect to a search. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing can be advantageous.

What is claimed is:

1. A method, comprising:
   receiving, by one or more processors, a plurality of text alerts, each text alert describing an event occurring on a computer system;
   normalizing each text alert into a respective string, including replacing a variable value with a variable name in each text alert and removing terms designated as stop words;
   for each pair of strings, computing a respective pair-wise distance, each pair-wise distance measuring a degree of similarity between the two strings in the respective pair;
   clustering the strings into a plurality of event clusters, wherein each event cluster includes a group of strings representing corresponding text alerts, each pair of strings in the group having a pair-wise distance that is shorter than a clustering threshold distance, and wherein the clustering includes representing, as two strings in a same cluster, two corresponding text alerts that are too different from one another to be clustered together without normalization, the two strings including variable names, rather than variable values, of terms in the two corresponding text alerts; and
   generating a user interface presentation that presents each event cluster of the plurality of event clusters with a visual indication of a respective number of occurrences of normalized text alerts having variable names belonging to the event cluster.

2. The method of claim 1, wherein the clustering comprises:
   representing each string as a node in a graph;
   connecting each pair of nodes by an edge upon determining that a pair-wise distance between text alerts represented by the pair of nodes is less than the clustering threshold distance; then
   detecting a plurality of groups of connected nodes in the graph;
   partitioning the groups of connected nodes in the graph by graph cutting until, for each group (i) a cluster radius of the group is not greater than a radius threshold or (ii) a cluster size of the group is not greater than a size threshold, whereby all groups of connected nodes in the graph have a cluster radius that is not greater than a radius threshold or a cluster size that is not greater than a size threshold; and
   designating each group of connected nodes after the partitioning as an event cluster.

3. A method comprising:
   receiving, by one or more processors, a plurality of text alerts, each text alert describing an event occurring on a computer system;
   normalizing each text alert, including replacing a variable value with a variable name in each text alert and removing terms designated as stop words;
   determining, for each term position, a frequency of each of one or more terms that appears at that term position in the normalized text alerts, wherein:
      each term position is a position in an order of terms in which a term appears in a left-justified or right-justified normalized text alert; and
      each frequency is a count of a particular term appearing in the normalized text alerts at that position or a ratio of the count of the particular term appearing in the normalized text alerts at that position to the sum of the counts of the terms appearing in the normalized text alerts at that position;
   generating a user interface presentation comprising a two-dimensional diagram, wherein the diagram presents frequencies of multiple terms on dimension of the diagram and ordered term positions on another dimension of the diagram; and
   presenting, within the user interface presentation, each normalized text alert of the plurality of normalized text alerts with a visual indication of a respective frequency of each of one or more terms appearing in the normalized text alert.

4. The method of claim 3, comprising grouping terms appearing at adjacent positions and providing the groupings for display.

5. A method comprising:
   receiving, by one or more processors, a plurality of text incidents, each text incident including unstructured text;
   normalizing each text incident, including replacing a variable value with a variable name in each text incident and removing from each text incident terms designated as stop words;
   representing the text incidents as a binary term-incident matrix, including:
      designating the text incidents as a first dimension of the binary term-incident matrix; and
      designating terms in the normalized text incidents as a second dimension of the binary term-incident matrix, wherein each element in the matrix represents whether a term appears in a corresponding normalized text incident, each term being a corresponding variable name;
   factorizing the binary term-incident matrix into a first low-rank matrix and second low-rank matrix each having a smaller size than size of the binary term-incident matrix, a column dimension of the second low-rank matrix corresponding to the text incidents;
   representing the second low-rank matrix as a k-dimensional tree (K-D tree) that partitions the second low-rank matrix into non-overlapping subsets;
   performing hierarchical clustering of the K-D tree to identify one or more incident clusters, each incident cluster comprising a group of normalized text incidents; and
   generating a user interface presentation that presents each of the one or more incident clusters with a visual indication of a respective number of occurrences of normalized text incidents having variable names belonging to the incident cluster.

6. The method of claim 5, wherein performing hierarchical clustering of the K-D tree comprises uses a parameter of a pair-wise distance between each pair of normalized text incidents.

7. The method of claim 6, wherein the pair-wise distance between a pair comprising a first normalized text incident and a second normalized text incident is determined using calculations comprising:
   determining a first cardinality of a largest text incident as measured by number of terms;
   determining a second cardinality of an intersection of the first normalized text incident and the second normalized text incident, the intersection being a set of terms that appear in both the first normalized text incident and the second normalized text incident; and
   designing a difference between the first cardinality and the second cardinality as the pair-wise distance between the first normalized text incident and the second normalized text incident.

8. The method of claim 5, comprising designating a centroid text incident in each incident cluster as an exemplar of the incident cluster that textually represents the incident cluster.

9. The method of claim 8, comprising:
   identifying a normalized text incident in each cluster that has a shortest distance to a farthest neighbor of the that normalized text incident; and
   designating the identified normalized text incident as the centroid of the each cluster.

10. The method of claim 8, comprising merging a plurality of incident clusters into an aggregated cluster based on most frequently used terms in each incident cluster.

11. The method of claim 10, wherein merging the plurality of incidence clusters comprises:
    determining, for each incident cluster, a most frequently used term list comprising a predetermined number of unique terms;
    calculating a distance between each pair of incident clusters using a cardinality of an intersection between most frequently used term lists of the pair of incident clusters, where a larger intersection corresponds to a shorter distance; and
    merging the plurality of incident clusters upon determining that distances between each pair of incident clusters are less than a threshold.

12. The method of claim 1, wherein computing a respective pair-wise distance is based on a cardinality of a largest string and sets of distinct words in a string.

13. The method of claim 12, wherein computing a respective pair-wise distance is based on a formula $\text{dist}(A, B) = \max_i |X_i| - |A \cap B|$, wherein $X_i$, A, and B are sets of distinct words in a token-normalized text incident, and $|\cdot|$ denotes the cardinality of a set, and wherein $\max_i |X_i|$, is a cardinality of a largest string.

14. The method of claim 5, wherein factorizing the binary term-incident matrix is based on non-negative matrix factorization, where the first low-rank matrix and second low-rank matrix contain non-negative elements.

15. The method of claim 14, wherein factorizing the binary term-incident matrix includes solving the problem $\min \|A - FG\|_F^2$, subject to $F_{ij} \geq 0$, $G_{ij} \geq 0$ for all i, j, wherein $\|\cdot\|_F$ denotes the Frobenius norm of a matrix, F denotes the first low-rank matrix, and G denotes the second low-rank matrix.

16. The method of claim 3, wherein each of the plurality of text alerts comprises semi-structured text data.

17. The method of claim 3, wherein stop words comprise words that commonly occur in all of the text alerts.

18. The method of claim 17, wherein stop words further comprise prefixes of the text alerts that are generated by one or more logging software applications.

19. The method of claim 3, wherein determining, for each term position, a frequency of each of one or more terms that appears at that term position in the normalized text alerts comprises generating one or more unigrams for each of one or more terms in each of one or more normalized text alerts, and recording one or more tuples, each comprising a term and its respective position in the normalized text alerts.

\* \* \* \* \*